United States Patent
Piramoon et al.

[19]

[11] Patent Number: 5,833,908
[45] Date of Patent: *Nov. 10, 1998

[54] METHOD FOR COMPRESSION MOLDING A FIXED CENTRIFUGE ROTOR HAVING SAMPLE TUBE APERTURE INSERTS

[75] Inventors: Alireza Piramoon, Santa Clara; Robert Wedemeyer, Palo Alto; Guillaume Crete, San Francisco, all of Calif.

[73] Assignee: Piramoon Technologies, Inc., Santa Clara, Calif.

[ * ] Notice: The term of this patent shall not extend beyond the expiration date of Pat. No. 5,776,400.

[21] Appl. No.: 561,525

[22] Filed: Nov. 21, 1995

Related U.S. Application Data

[63] Continuation-in-part of Ser. No. 431,544, May 1, 1995, Pat. No. 5,643,168.
[51] Int. Cl.⁶ ............................... B27N 5/02; B29C 43/18
[52] U.S. Cl. .......................... 264/250; 264/257; 264/258; 264/277; 494/12; 494/16; 494/20; 494/31; 494/33; 494/43; 494/81; 494/85; 74/572; 74/573 R; 74/574
[58] Field of Search ..................................... 264/257, 258, 264/250, 277; 494/12, 16, 20, 31, 33, 43, 81, 85; 74/572, 573 R, 574

[56] References Cited

U.S. PATENT DOCUMENTS

| | | | |
|---|---|---|---|
| 1,979,954 | 11/1934 | Bergman | 18/59 |
| 2,028,040 | 1/1936 | Benge | 117/27.5 |
| 2,128,097 | 8/1938 | Mains | 117/27.5 |
| 2,372,983 | 4/1945 | Richardson | 57/76 |
| 2,525,469 | 10/1950 | Anderson | 57/76 |
| 2,594,693 | 4/1952 | Smith | 57/76 |
| 2,965,220 | 12/1960 | Naul | 206/2 |
| 5,362,301 | 11/1994 | Malekmadani et al. | 494/16 |

FOREIGN PATENT DOCUMENTS

WO 93/25315  12/1993  WIPO .

Primary Examiner—Jan H. Silbaugh
Assistant Examiner—Robin S. Gray
Attorney, Agent, or Firm—Townsend and Townsend and Crew

[57] ABSTRACT

In the compression molding of a fixed angle centrifuge rotor utilizing discontinuous fibers, sample tube apertures cores present in the net-shape mold are covered with pre-cured sample tube aperture inserts. The sample tube aperture inserts have a constant and unchanging inside diameter and are formed from composite fiber. This composite fiber extends from the closed bottom of the inserts, upwardly along the sides of the inserts to the open top of the inserts to provide tensile strength longitudinally of the sample tube aperture inserts. The sample tube aperture inserts have a regular and smooth inside for first accommodating the sample tube aperture cores when the rotor is compression molded and later the sample tubes themselves when the rotor is fully fabricated. These inserts have an irregular outside for forming an interference fit with the subsequently formed compression molded rotor body. Finally, the sample tube aperture inserts have a tapered thickness with the top and open portion of the inserts having a thick wall construction and the bottom and closed portion of the inserts having a thinner wall construction. In use, and when the compression mold is loaded, the sample tube aperture inserts are placed over the sample tube aperture cores. When the mold is fully loaded, and compression molding occurs, the inserts integrally form to the rotor body and the sample tube aperture cores are removed.

6 Claims, 9 Drawing Sheets

METHOD FOR COMPRESSION MOLDING A FIXED CENTRIFUGE ROTOR HAVING SAMPLE TUBE APERTURE INSERTS

This application is a continuation-in-part of application Ser. No. 08/431,544, filed May 1, 1995, now U.S. Pat. No. 5,643,168 application Ser. No. 08/431,544 is incorporated herein by reference.

This invention relates to composite fiber centrifuge rotors. More particularly, a composite fiber centrifuge rotor fabricated from discontinuous fibers by compression molding is provided with sample tube aperture inserts. In this rotor, sample tube aperture inserts are placed over sample tube aperture cores during compression molding of the rotor body. This enables the rotor body to be produced with a so-called "net shape" requiring a minimum of machining to finish the centrifuge rotor.

Further, that Continuation-In-Part patent application entitled Net Shaped Composite Material Fixed Angle Rotor, U.S. patent application Ser. No. 08/561,524, filed on even date herewith, now abandoned, is also incorporated by reference. We note that the shape of the rotor therein disclosed constitutes a preferred embodiment of this invention.

BACKGROUND OF THE INVENTION

Composite material centrifuge rotors are known. In such rotors, composite fibers with superior anisotropic tensile properties are utilized to form light, strong centrifuge rotors.

PATENT APPLICATION NOT PRIOR ART

Rotors having compression molded discontinuous fibers are known. Specifically, in a patent application Ser. No. 08/431,544 filed May 1, 1995 entitled Compression Molded Composite Material Fixed Angle Rotor, now U.S. Pat. No. 5,643,168 we have disclosed a method for compression molding of a so-called "fixed angle centrifuge rotor."

Fixed angle centrifuge rotors are well known. By convention, such fixed angle centrifuge rotors include plurality of sample tube apertures having inserted inclined sample tubes. Typically, the open top of the sample tube is adjacent the spin axis of the rotor; the closed bottom of the sample tube is remote from the spin axis of the rotor. The sample tube is placed within a plane including the spin axis of the rotor and inclined at 23° with respect to the spin axis of the rotor.

During centrifugation, heavy particles within the sample migrate under enhanced gravity fields to the bottom and outside of the sample tubes; light particles remain at the top inside of the sample tubes.

So called fixed angle rotors of composite material have usually been fabricated from layers of composite cloth, the cloth layers being normal to the spin axis of the rotor. In order to prevent delamination of such rotors, it has been necessary to provide the rotors with a spiral wind of exterior composite fiber. Because of the necessity of maintaining such fiber on the exterior of the rotor, sample tube inclination is not standard. Specifically, sample tube inclination in such rotors is at 19°.

PROBLEM ENCOUNTERED

In the molding and testing of such centrifuge rotors, we have discovered that there can be a weakness where fibers are compression molded for forming a rotor body. Specifically, the sample tube aperture contains the sample tube with the sample being centrifugated. This sample tube when fully loaded tries to move downward within the sample tube aperture. Such downward movement places increased strain on the bottom of the rotor. Similar to the case of the composite rotor constructed of laminates, this strain can either de-laminate the rotor or actually cause rotor failure.

Additionally, we have tried to compression mold rotors to a "net shape." This is a shape where major machining is not required on the rotor surface. Unfortunately, we have also found that withdrawing sample tube aperture cores from such net shape molds requires extraordinary force; the sample tube aperture cores for forming the sample tube apertures are not easily withdrawn.

An attempt has been made to remedy this condition by compression molding the rotors without the sample tube aperture cores being present. This has proved unsatisfactory for several reasons.

First, it is most desirable to compression mold rotors utilizing so-called sheet molding compound. Sheet molding compound in the vicinity of the sample tube apertures is usually placed normal to the spin axis of the rotor. Where a rotor is molded with the sample tube aperture cores not utilized to form the sample tube apertures, the sheet molding compound remains largely undisturbed; the sheet molding compound naturally disposes the fibers normal to the spin axis of the rotor. Unfortunately, when the discontinuous fibers utilized in compression molding are largely undisturbed, and remain normal to the spin axis of the rotor, they can easily de-laminate. We have in fact observed delamination under centrifugation when the sample tube apertures of a fixed angle rotor having machined sample tubes are loaded and centrifugated with samples.

This invention is in response to these observed problems.

The reader will understand that invention can be claimed in understanding the problem to be solved. We are unaware of the prior either disclosing or suggesting the problems that we have encountered. Accordingly, we claim invention related to the discovery of the above problems as well as the required solution.

PRIOR ART

It is known to have sample tube aperture inserts of materials other than composite materials. In this regard, attention is directed to Keunen et al. U.S. Pat. No. 4,824,429 issued Apr. 25, 1989 where stainless steel inserts are placed within a molded plastic rotor having pre-wound and cured fiber rings placed over the rotor for reinforcement.

Other than show the presences of these inserts, this reference makes no mention of the purpose of the inserts. Further, no mention is made of the necessity to reinforce the bottom of the rotor during centrifugation to avoid failure of the rotor body at the bottom surface. Additionally, and because of the high forces encountered, stainless steel does not have sufficient tensile strength to resist the forces involved in centrifugation of rotors of this kind. Further its weight is not acceptable. Finally, there is no teaching of suggestion of both the problem encountered herein nor the solution to that problem.

SUMMARY OF THE INVENTION

In the compression molding of a fixed angle centrifuge rotor utilizing discontinuous fibers, sample tube apertures cores present in the net-shape mold are covered with pre-cured sample tube aperture inserts. The sample tube aperture inserts have a constant and unchanging inside diameter and are formed from resin impregnated composite fiber. This composite fiber extends from the closed bottom of the inserts, upwardly along the sides of the inserts to the open top of the inserts to provide tensile strength longitudinally of the sample tube aperture inserts. The sample tube aperture inserts have a regular and smooth inside for first accommodating the sample tube aperture cores when the rotor is compression molded and later the sample tubes themselves when the rotor is fully fabricated. These inserts have an irregular outside for forming an interference fit with the subsequently formed compression molded rotor body. Finally, the sample tube aperture inserts have a tapered thickness with the top and open portion of the inserts having a thick wall construction and the bottom and closed portion of the inserts having a thinner wall construction. In use, and when the compression mold is loaded, the sample tube aperture inserts are placed over the sample tube aperture cores. When the mold is fully loaded, and compression molding occurs, the inserts integrally form to the rotor body and the sample tube aperture cores are removed. During centrifugation, the sample tube aperture inserts distribute the load of the sample tube evenly along the length of the inserts through to the body of the rotor.

These sample tube aperture inserts strengthen the compression molded fixed angle rotor in at least six discrete ways. First, the sample tube aperture cores can easily be withdrawn or de-molded from the net shape fixed angle centrifuge rotor; strain on the net shaped molded rotor body from either machining of the sample tube apertures or withdrawal of the sample tube aperture cores under great force is avoided.

Second, the pre-cured sample tube aperture inserts are formed of composite material so as to have considerable strength longitudinally of the sample tube aperture. Thus, the inserts can distribute the loading of the sample tube with contained sample vertically over the length of the sample tube aperture.

Third, the sample tube aperture inserts have an irregular exterior surface. During compression molding of the rotor, the inserts form an interference fit with the compression molded discontinuous fiber of the rotor body.

Fourth, the sample tube aperture inserts have a tapering section with relatively thick walls at the open, top, inside of the sample tube aperture and thinner walls at the closed, bottom, outside of the sample tube aperture. The sample tube aperture inserts in effect wedge themselves into the rotor, distributing their loading over the length of the inserts.

Fifth, the sample tube aperture inserts make possible net shape molding of the sample tube apertures. This net shape molding disturbs the horizontally disposed discontinuous fiber of the rotor during compression molding of the fixed angle centrifuge rotor. The fiber adjoining the sample tube aperture is given a vertical component, further strengthening the rotor.

Sixth, and finally, the sample tube aperture inserts form a continuous surface adjacent the sample tubes. Discontinuities of construction in the rotor body cannot propagate through the sample tube aperture inserts; therefore the sample tubes encounter an uninterrupted and continuous preformed fiber surface which is preformed in advance of the main rotor body.

An important advantage is present over prior art laminated rotors that are diagonally wound with fiber. Specifically, in such rotors, it has not generally been possible to have the sample tubes at angles exceeding 19°. This has been because the side slope of the rotor body would not allow the diagonally wound fibers to permanently adhere to and reinforce such rotors.

In the present rotor, because of the presence of the sample tube aperture inserts, sample tube apertures can be inclined to the full 23.5°, making conventional rotor construction possible.

DESCRIPTION OF THE PREFERRED EMBODIMENT

Figure 1:
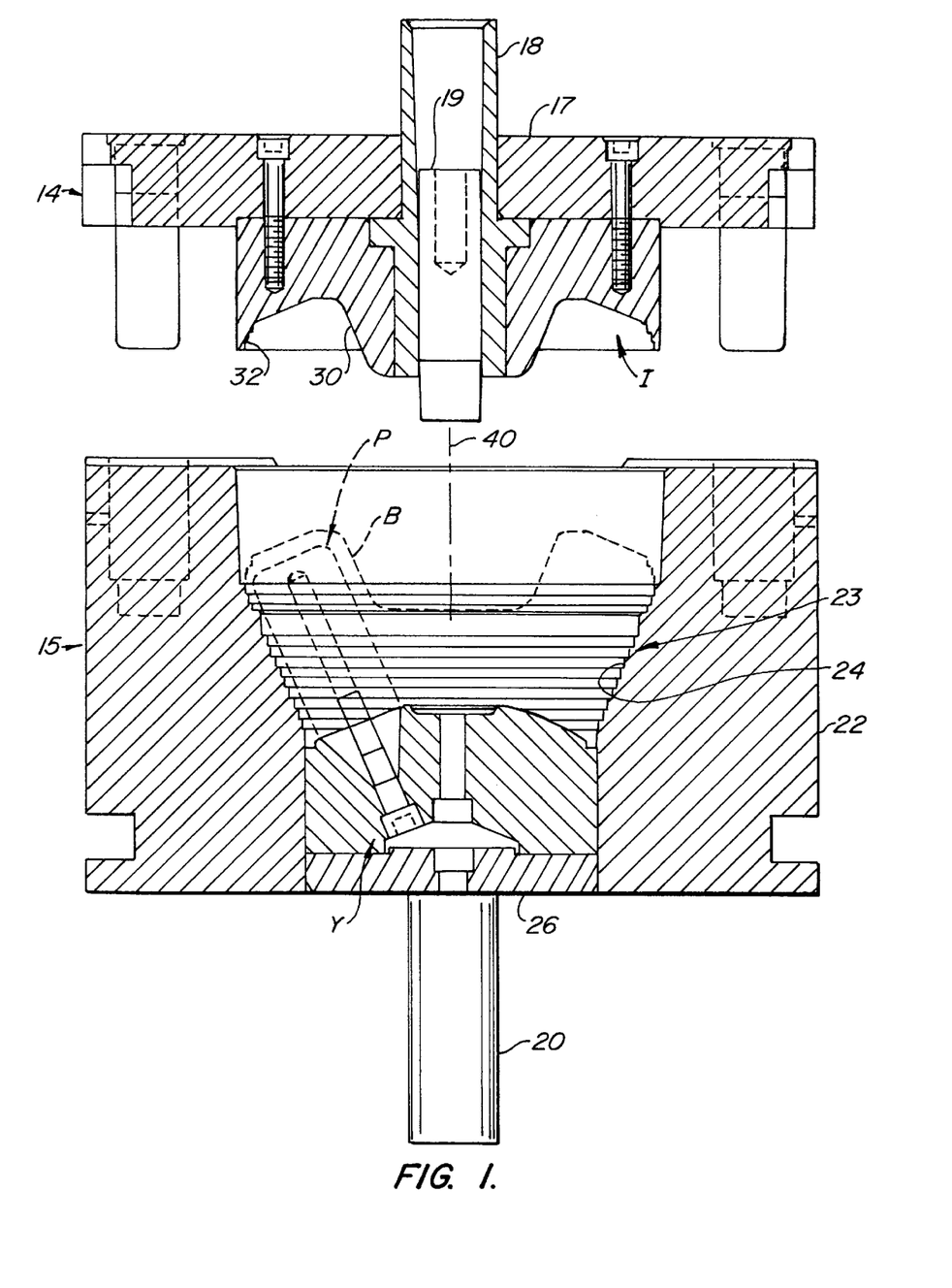
FIG. 1 is a side elevation section of a rotor being compression molded in a mold contained within a compression molding press with the sample tube aperture cores being shown covered with a sample tube aperture insert.

Referring to FIG. 1, open mold M is illustrated having upper section 14 and lower section 15. Upper section 14 includes upper base 17, ram sleeve 18, and ram 19. Supported on upper base 17 is mold insert I having rotor bottom forming surface 30 and rotor bottom step forming surfaces 32.

Lower section 15 includes ejector bar 20 and lower base 22. Lower base 22 defines interiorly thereof frustum shaped cavity 23 having steps 24 defined on the surface thereof. When a rotor body is formed interiorly of open mold M, these steps 24 form exterior and complimentary steps on the surface of the rotor body which when machined allow windings to reinforce the rotor.

Ejector bar 20 supports ejector plate 26 which in turn supports yoke Y. Some special attention can be given to the construction of yoke Y.

Formed rotor body B is shown interior of lower base 22. Presuming that rotor body B has been molded interior of lower base 22, release from frustum shaped cavity 23 interior of the lower base must occur. To this end, sample tube aperture cores A must be held interior of frustum shaped cavity 23. The construction of the sample tube aperture cores A can be best understood with reference to FIG. 3.

Figure 3:
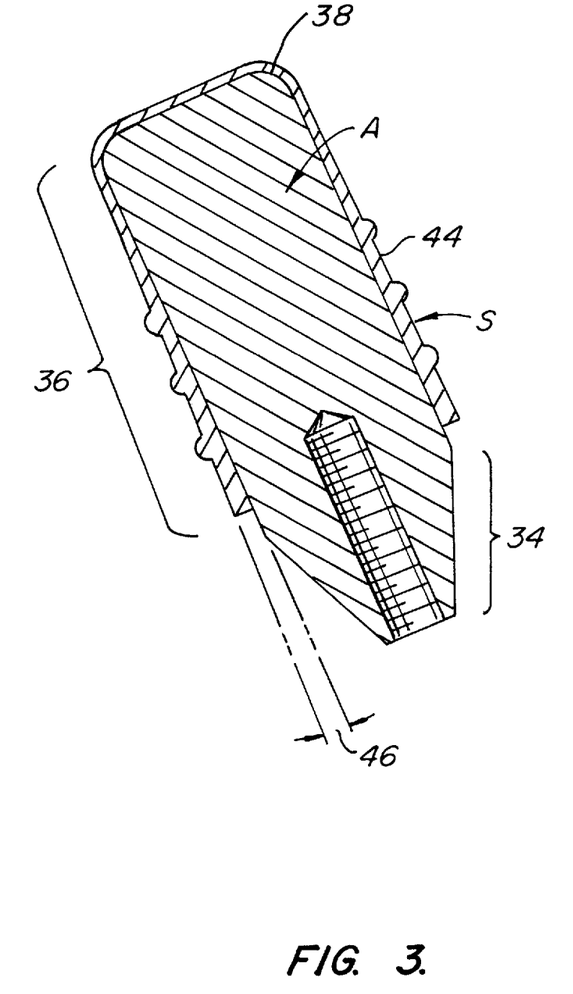
FIG. 3 is a side elevation section of a sample tube aperture insert separate and apart from a rotor body.

Referring to FIG. 3, sample tube aperture cores A have frustum shaped portion 34 and cylindrical shaped portion 36 with rounded bottom 38. Cylindrical shaped portion 36 forms sample tube aperture P. Frustum shaped portion 34 insures release of sample tube aperture cores A with the formed rotor body B. It will be observed that frustum shaped portion 34 has a slope adjacent mold axis 40 that permits upward withdrawal of rotor body B with mold insert I within the rotor body. Once rotor body B is clear of mold M, mold inserts I may then be withdrawn.

Figure 2:
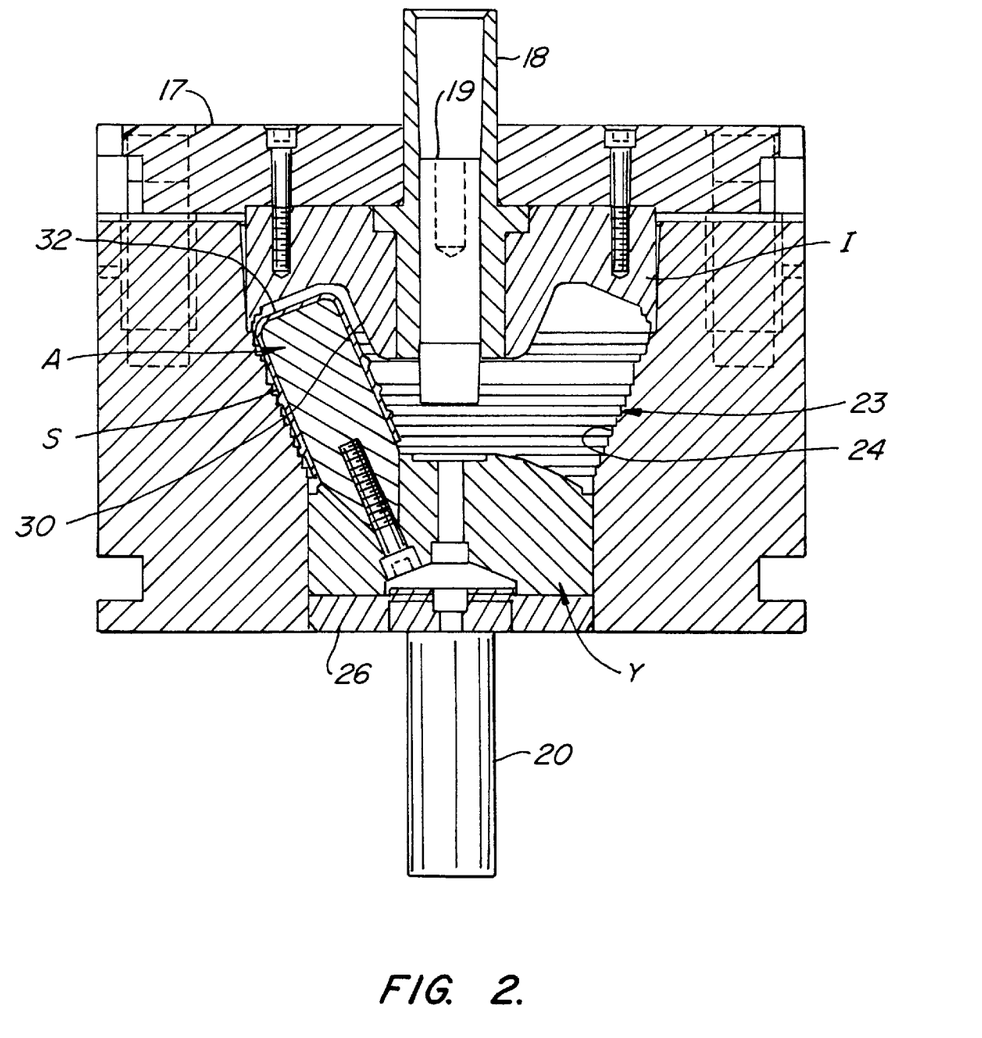
FIG. 2 is an expanded side elevation section of the mold illustrated in FIG. 1 so that the individual parts and sequential function of the mold can be understood.

Referring to FIG. 2, a single sample tube aperture core A is illustrated covered with sample tube aperture insert S. Sample tube aperture insert S covers sample tube aperture cores A at cylindrical shaped portion 36 as illustrated in FIG. 3.

Before discussing the possible constructions of sample tube aperture cores A, operation of mold M in cooperation with sample tube aperture insert S should be briefly set forth. First, mold M is charged with discontinuous fiber material to be molded. Second, sample tube aperture insert S are placed over sample tube aperture cores A. Thereafter, molding occurs.

Once molding occurs, mold M is opened and rotor body B is withdrawn. Thereafter, sample tube aperture cores A are withdrawn from rotor body B. A molded rotor body results.

It should be understood that the presence of sample tube aperture insert S improves rotor body B in at least six ways.

First, the sample tube aperture cores can easily be withdrawn or de-molded from the net shape fixed angle centrifuge rotor; strain on the net shaped molded rotor body from either machining of the sample tube apertures or withdrawal of the sample tube aperture cores under great force is avoided.

Second, the pre-cured sample tube aperture inserts are formed of composite material so as to have considerable strength longitudinally of the sample tube aperture. Thus, the inserts can distribute the loading of the sample tube with contained sample vertically over the length of the sample tube aperture. This loading is primarily on the bottom of sample tube aperture insert S. Fiber alignment interior of sample tube aperture insert S causes loading from the bottom to be redistributed to sidewalls 42 of sample tube aperture insert S.

Third, the sample tube aperture inserts have an irregular exterior surface. The irregular surface is shown in the form of circular annular protrusions 44. During compression molding of the rotor, the sidewalls 42 at form an interference fit with the compression molded discontinuous fiber of the rotor body.

It should be understood that circular annular protrusions 44 are not required to be in the format illustrated in FIG. 3. In practice, it will be found that the fibrous exterior of sample tube aperture insert S is often sufficient by itself to appropriately key the inserts to rotor body B.

Fourth, the sample tube aperture inserts have a tapering section with relatively thick walls at the open, top, inside of the sample tube aperture and thinner walls at the closed, bottom, outside of the sample tube aperture. This tapering section is indicated by angle 46 towards the top of sample tube aperture insert S. The sample tube aperture inserts in effect wedge themselves into the rotor, distributing their loading over the length of the inserts.

Fifth, it will be understood that rotor body B is formed with flatly disposed fibers in what is commonly referred to as sheet molding compound. The presence of the sample tube aperture inserts insures net shape molding of the sample tube apertures. This net shape molding disturbs the horizontally disposed discontinuous fiber of the sheet molding compound from which rotor body B is formed during compression molding. The fiber adjoining the sample tube aperture is given a vertical component, further strengthening the rotor. This further strengthening results from some of the discontinuous fibers being vertically disposed adjacent the sample tube aperture. Thus, the vertical fiber disposition of sample tube aperture insert S has fibers in rotor body B adjacent sample tube aperture insert S also vertically disposed.

Sixth, and finally, the sample tube aperture inserts form a continuous surface adjacent the sample tubes. Discontinuities of construction in the rotor body cannot propagate through the sample tube aperture inserts; therefore the sample tubes encounter an uninterrupted and continuous preformed fiber surface which is preformed in advance of the main rotor body.

Figure 4:
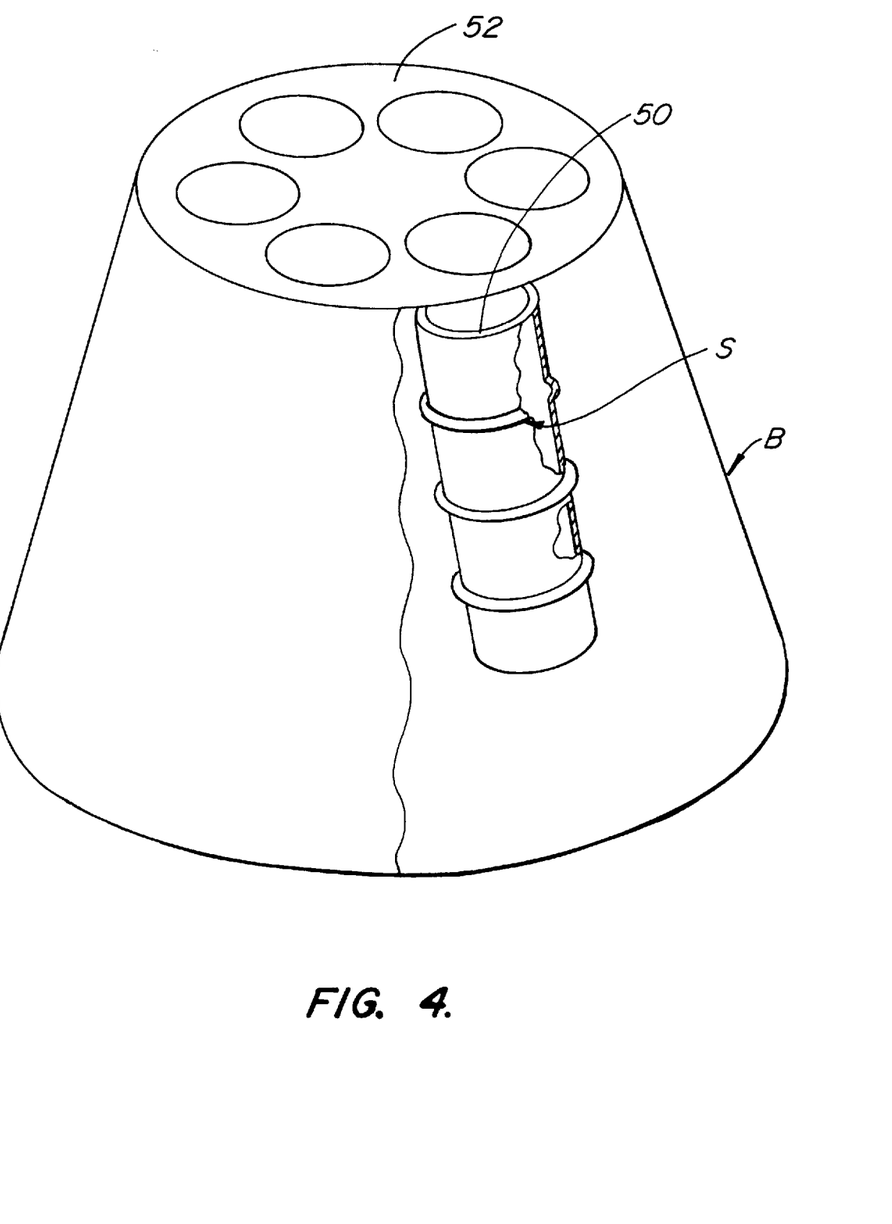
FIG. 4 is a side elevation section of a sample tube aperture insert integrally molded to a sample tube aperture within a rotor body illustrating the interference fit, the wedging of the insert to the rotor body, the disturbance of fibers adjacent the sample tube aperture from the horizontal to the vertical so that vertical loading placed on the insert can be vertically distributed over the length of the rotor.

Referring to FIG. 4, a cut away section of rotor body B is illustrated. Sample tube aperture insert S is shown imbedded in rotor body B. It will be seen that top 50 of sample tube aperture insert S is short of rotor body top 52. This is the preferred construction and imparts to rotor body top 52 a continuous construction which gives no exterior appearance of the presence of sample tube aperture insert S.

Having set forth the general purpose and operation of sample tube aperture inserts S, differing possible constructions can be set forth.

Figure 5A:
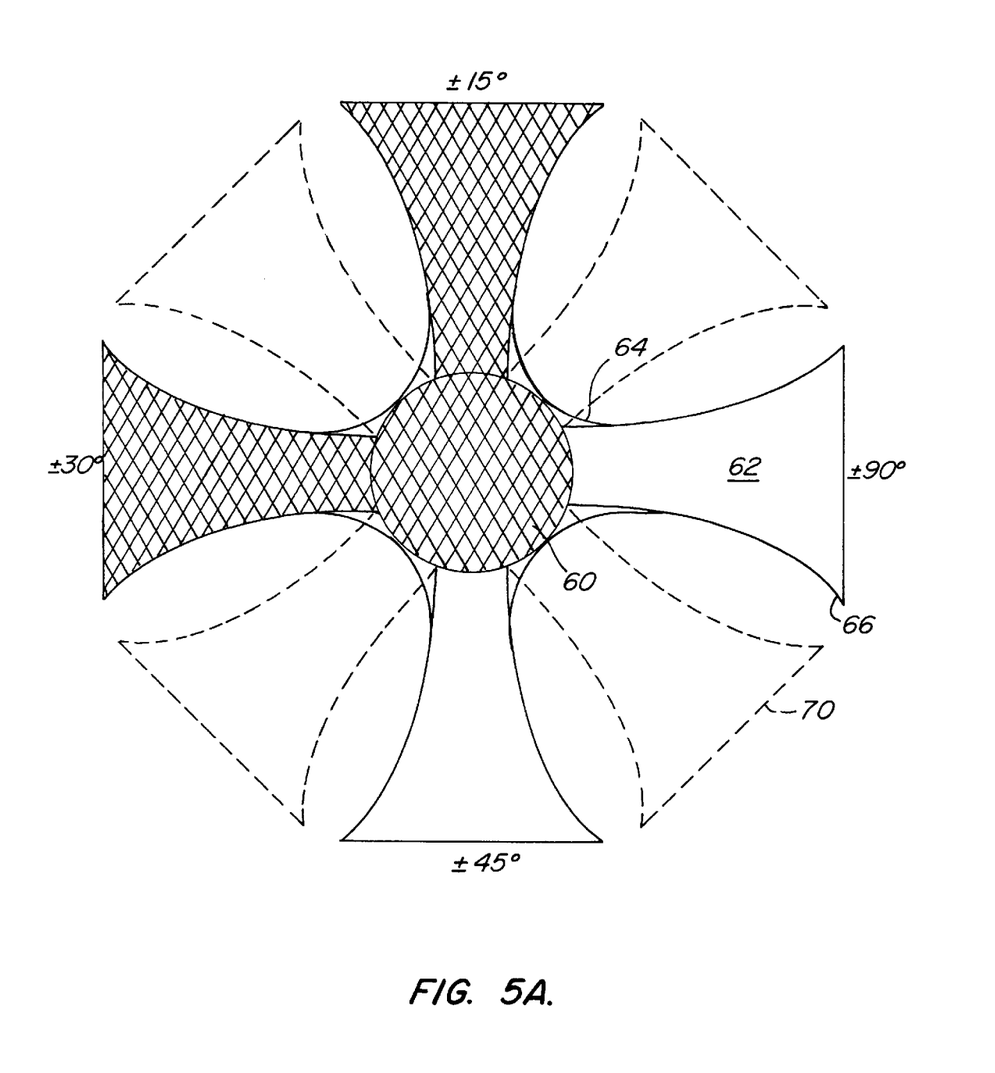
FIGS. 5A and 5B, are respective exploded and assembled and cured perspective sections of sample tube aperture inserts for insertion to compression molded centrifuge rotors.
Figure 5B:
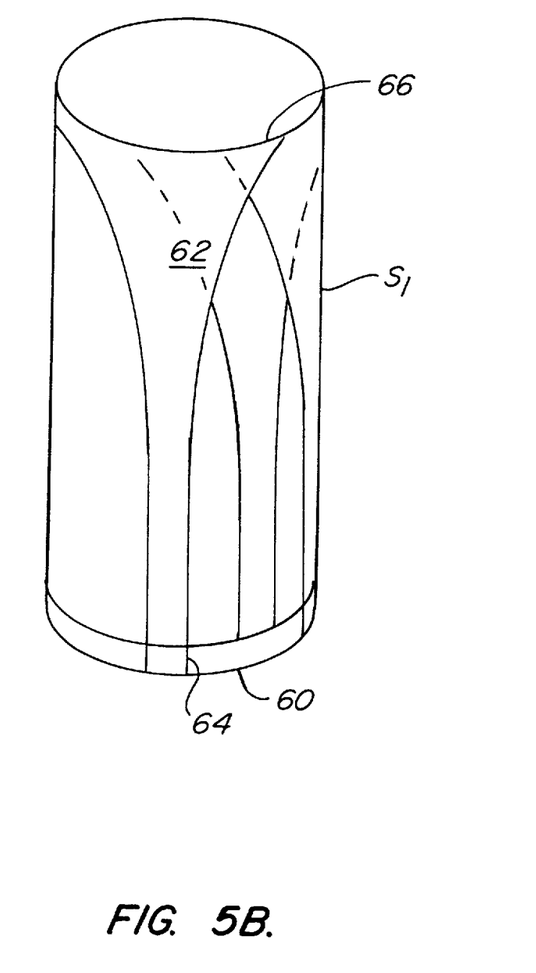

Referring to FIG. 5A, an "iron cross" construction is illustrated. Central bottom portion 60 has flare portions 62 with generally narrower base 64 and wider distal section 66 remote from central bottom portion 60. As suggested by broken line insert portion 70, more than one of these respective iron cross fiber sections 59 is placed one on top of another. The sections are then molded about a cylindrical mold which for all practical purposes has the same dimension as cylindrical shaped portion 36 of sample tube aperture cores A. Conventional curing of sample tube aperture insert S occurs by placing plastic about iron cross fiber sections 59, drawing a vacuum on iron cross fiber sections 59 over the molding cores, and subjecting the impregnated fiber with sufficient heat to effect setting of its resin system. Sample tube aperture insert $S_1$ is formed.

Figure 6:
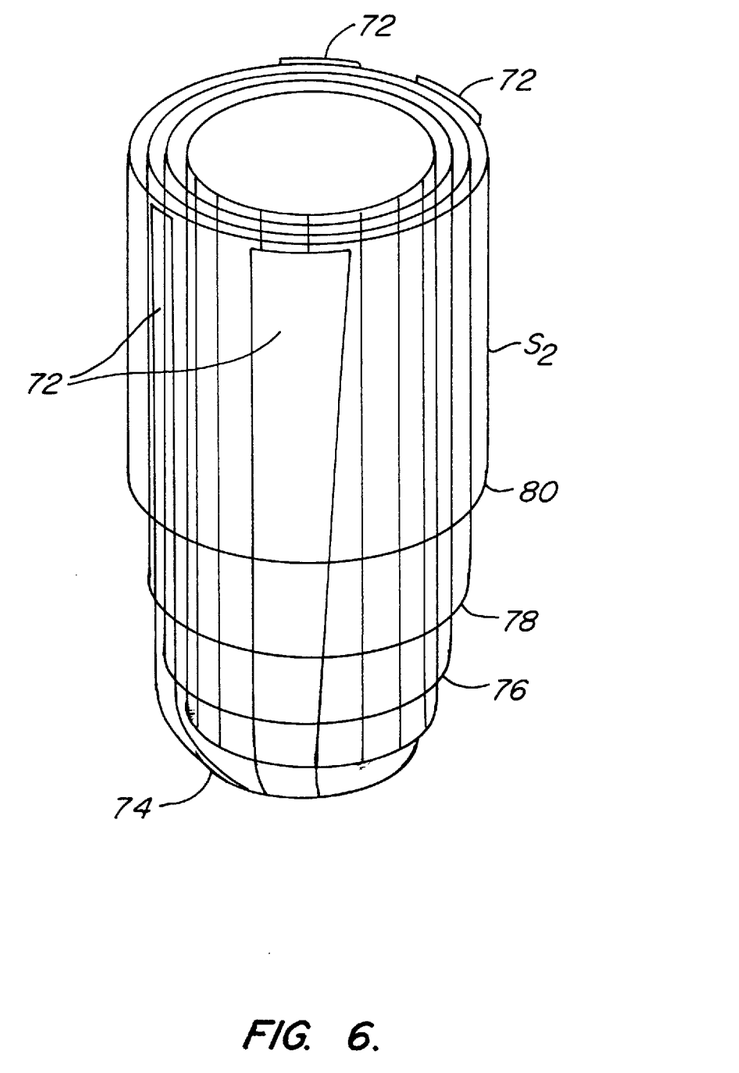
FIGS. 6 is a partially assembled view of a sample tube aperture insert.

Referring to FIG. 6, an alternate construction of sample tube aperture insert $S_2$ is illustrated. Discrete tape layers 72 are laid over bottom 74 of sample tube aperture insert $S_2$. Circular wrapping layers 76, 78, and 80 are placed wrapping peripherally about sample tube aperture insert $S_2$. When these respective layers are conventionally compressed under a vacuum wrap and appropriately heated, sample tube aperture insert $S_2$ results having the preferred tapered wall construction and irregular surface.

Figure 7A:
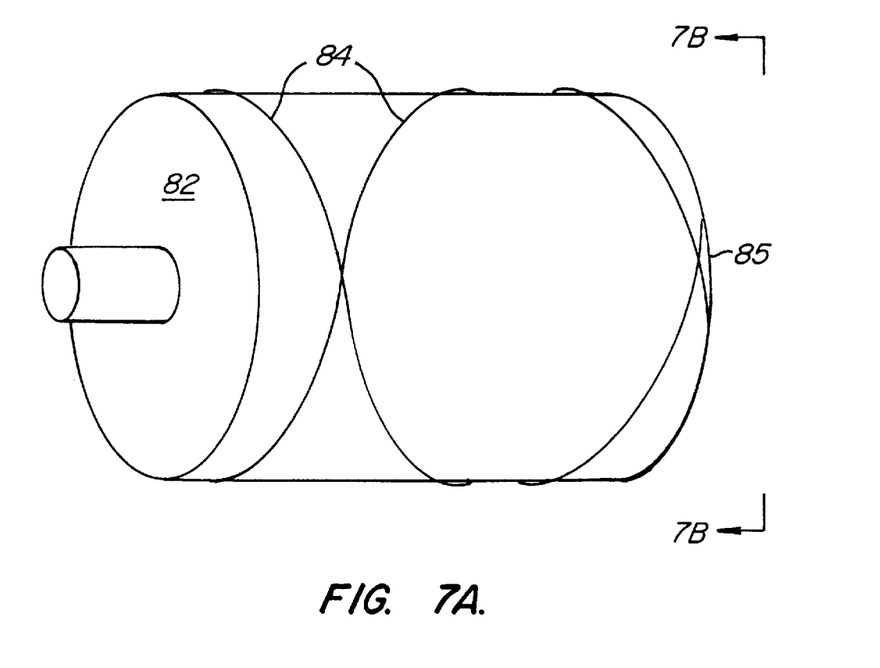
FIGS. 7A and 7B illustrate a sample tube aperture insert being wound on a mandrel; and, FIGS. 8A and 8B are yet another embodiment of sample tube aperture inserts being wound on a mandrel.
Figure 7B:
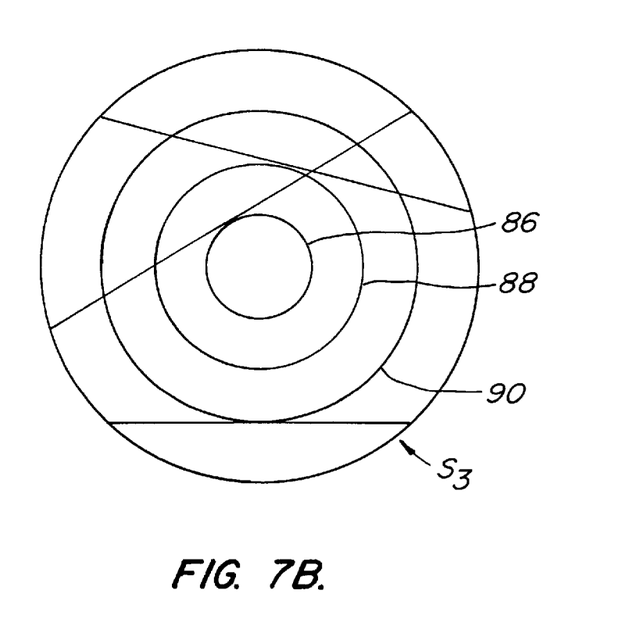

Referring to FIGS. 7A and 7B, mandrel 82 is shown diagonally wound with continuous fibers 84. Diagonal winding occurs so that circular bottom 85 of mandrel 82 is covered at successively decreasing diameters 86, 88, and 90. When these fibers are impregnated by resin and cured, sample tube aperture insert $S_3$ as shown in FIG. 7B results. It will be realized that continuous fibers 84 when wound at an angle have a vertical component. This vertical component distributes the vertical loading of a contained sample tube within the sample tube aperture vertically of rotor body B. Further, continuous fibers 84 lend a discontinuous surface to the exterior of sample tube aperture insert $S_3$ which enables keying of the insert to rotor body B.

Figure 8A:
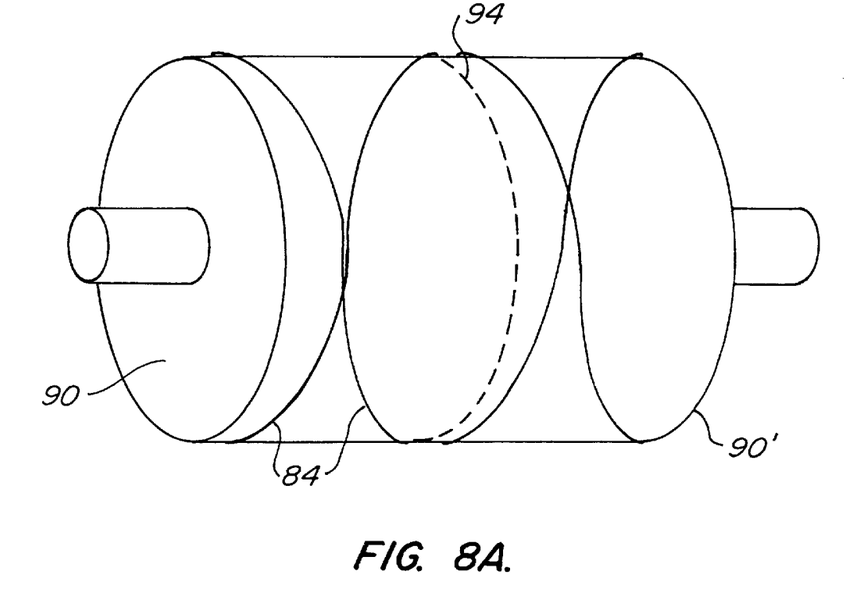
Figure 8B:
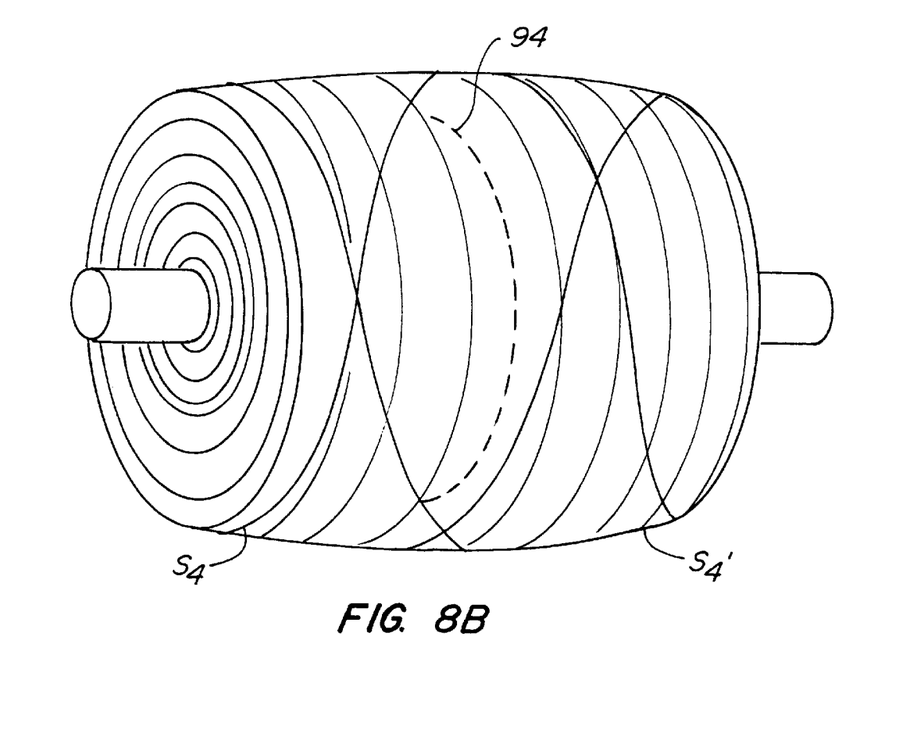

Referring to FIG. 8A, two part mandrel 90 is illustrated. As in FIGS. 7A and 7B, continuous fibers 84 are wound diagonally with the wind extending over two part mandrel 90 at the respective ends. The windings—impregnated with resin—are thereafter conventionally cured. Thereafter, cutting of the cured body at cut line 94 separating the two rotor sections occurs. Two sample tube aperture inserts $S_4$ and $S_4'$ results.

What is claimed is:

1. A process for molding a fixed angle centrifuge rotor having, a resin bound discontinuous fiber rotor body having a top and a bottom symmetrical about a spin axis, the fixed angle centrifuge rotor further having inclined sample tube apertures, each of said inclined sample tube apertures having a top opening to the top of the resin bound discontinuous fiber rotor body and toward the spin axis, each of the inclined sample tube apertures having a closed bottom extending near the bottom of the resin bound discontinuous fiber rotor body with the closed bottom of each of the inclined sample tube apertures being more remote from the spin axis, the process of molding the fixed angle centrifuge rotor further comprising the steps of:

providing a mold for compression molding the resin bound discontinuous fiber rotor body;

attaching sample tube aperture cores to the mold;

placing a separate sample tube aperture insert over each one of said sample tube aperture cores, each said separate sample tube aperture insert having sidewalls and including a closed sample tube aperture insert bottom for holding a sample tube bottom, said sidewalls having an inside diameter defining an outside diameter of said sample tube to be received within said separate sample tube aperture insert, each said separate sample tube aperture insert being formed from composite fiber material aligned with individual fibers having tensile components for transferring load on the sample tube aperture insert bottom to the sidewalls of the separate sample tube aperture insert;

charging the mold with a discontinuous fiber-resin mixture to surround and cover each said separate sample tube aperture insert in said mold;

compression molding each said separate sample tube aperture insert in said mold collectively with the discontinuous fiber-resin mixture in the mold under heat and pressure to cause exterior surfaces of each said separate sample tube aperture insert to be integrally molded with said discontinuous fiber-resin mixture to form said fixed angle cetrifuge rotor;

removing the fixed angle centrifuge rotor from the mold; and, from each said separate sample tube aperture insert, removing a corresponding one of said sample tube aperture cores therein.

2. The process for molding a fixed angle centrifuge rotor according to claim 1 and including the further step of:

forming each said sample tube aperture insert from resin impregnated fiber; and, curing each said sample tube aperture insert before said step of placing.

3. The process for molding a fixed angle centrifuge rotor according to claim 2 wherein each said sample tube aperture insert is formed with an irregular surface on an outer side surface.

4. The method of claim 1 wherein each said separate sample tube aperture insert has an irregular exterior surface for forming an interference fit with the resin bound discontinuous fiber rotor body.

5. The method of claim 1 wherein said sidewalls of each said separate sample tube aperture insert is defined by a tapering section of relatively thick walls at an open top of each said separate sample tube aperture insert and thinner walls at said closed sample tube aperture insert bottom.

6. The method of claim 1 wherein each said separate sample tube aperture insert is pre-cured.

* * * * *